United States Patent
Span et al.

(10) Patent No.: US 12,485,957 B2
(45) Date of Patent: Dec. 2, 2025

(54) STEERING GEAR APPARATUS FOR A STEER-BY-WIRE STEERING SYSTEM

(71) Applicant: ZF Automotive Germany GmbH, Alfdorf (DE)

(72) Inventors: Eduard Span, Cologne (DE); Gregor Watzlawek, Dusseldorf (DE); Frank Jaehde, Cologne (DE); Yavuz Demir, Lünen (DE); Ali Al-Jabri, Gelsenkrichen (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 0 days.

(21) Appl. No.: 18/504,279

(22) Filed: Nov. 8, 2023

(65) Prior Publication Data

US 2024/0149938 A1   May 9, 2024

(30) Foreign Application Priority Data

Nov. 9, 2022 (DE) .......................... 102022211871.5

(51) Int. Cl.
*B62D 5/04* (2006.01)
*B62D 15/02* (2006.01)

(52) U.S. Cl.
CPC ......... *B62D 5/0454* (2013.01); *B62D 5/0403* (2013.01); *B62D 5/0421* (2013.01); *B62D 15/0225* (2013.01)

(58) Field of Classification Search
CPC .......................... B62D 5/0454; B62D 15/0225
See application file for complete search history.

(56) References Cited

U.S. PATENT DOCUMENTS

| | | | |
|---|---|---|---|
| 11,661,105 B2* | 5/2023 | Kogure | B62D 6/04 701/41 |
| 11,708,108 B2* | 7/2023 | Kim | B62D 3/12 74/422 |
| 2016/0280253 A1* | 9/2016 | Ueno | B62D 3/12 |
| 2020/0156702 A1* | 5/2020 | Dodak | G01D 5/145 |
| 2021/0221427 A1* | 7/2021 | Span | B62D 5/001 |

* cited by examiner

*Primary Examiner* — Jake Cook
(74) *Attorney, Agent, or Firm* — Tarolli, Sundheim, Covell & Tummino LLP

(57) ABSTRACT

A steering gear apparatus for a steer-by-wire steering system of a motor vehicle has a sliding rod, which has a rack with a toothing, a gear section, which has a worm gear with a worm wheel and a drive pinion extending in an axial direction (A), a motor and a steering angle sensor. The motor is connected here to the drive pinion via the worm gear so as to transmit torque, and the drive pinion is in toothed engagement with the toothing. The steering angle sensor is coupled here to the drive pinion, in particular so as to transmit torque.

17 Claims, 2 Drawing Sheets

STEERING GEAR APPARATUS FOR A STEER-BY-WIRE STEERING SYSTEM

CROSS-REFERENCE TO RELATED APPLICATION

This application claims priority to German Priority Application No. 102022211871.5, filed Nov. 9, 2022, the disclosure of which is incorporated herein by reference in its entirety.

TECHNICAL FIELD

The disclosure relates to a steering gear apparatus for a steer-by-wire steering system of a motor vehicle, having a sliding rod, which has a rack with a toothing, having a gear section, which has a worm gear with a worm wheel and a drive pinion extending in an axial direction, having a motor and having a steering angle sensor, wherein the motor is connected via the worm gear to the drive pinion so as to transmit torque, and the drive pinion is in toothed engagement with the toothing.

BACKGROUND

Steering systems conventionally comprise a sliding rod which is mounted so as to be linearly displaceable in order to adapt a wheel position. A sliding rod of this type has originally been coupled to the steering wheel via a steering rod such that a linear displacement of the sliding rod is achieved by rotation of the steering wheel.

In future, use will increasingly be made of motor vehicles having what are referred to as steer-by-wire steering systems (SbW steering system), hi which there is no longer a mechanical connection between the steering wheel and the sliding rod. The position of the steering wheel is detected electronically and a corresponding displacement of the sliding rod is achieved by an electric drive.

The sliding rod here is part of a steering gear apparatus which is designed to support the sliding rod displaceably and to detect the displacement or deflection thereof via a steering angle sensor.

A challenge when designing steering gear apparatuses for a steer-by-wire steering system consists in designing them so as to particularly save on construction space.

SUMMARY

The present disclosure describes a steering gear apparatus for a steer-by-wire steering system which is constructed compactly.

A steering gear apparatus for a steer-by-wire steering system of a motor vehicle can include a sliding rod, which has a rack with a toothing, having a gear section, which has a worm gear with a worm wheel and a drive pinion extending in an axial direction, having a motor and having a steering angle sensor. The motor is connected here to the drive pinion by the worm gear so as to transmit torque, and the drive pinion is in toothed engagement with the loathing. Furthermore, the steering angle sensor is coupled to the drive pinion, in particular so as to transmit torque.

It has been recognised according to the exemplary arrangement that this design means that the steering gear apparatus has a particularly compact construction.

In this connection, the steering angle sensor can be attached directly to the drive pinion, as a result of which the steering gear apparatus can be designed even more compactly.

Additionally or alternatively, the drive pinion can be the only drive pinion, in particular the only pinion, which is in toothed engagement with the sliding rod. As such, the steering gear apparatus has particularly few components and can therefore be produced particularly cost-effectively and configured so as to save space.

In an exemplary arrangement, the toothing is the only toothing of the rack, in particular of the sliding rod, and therefore the sliding rod can be produced particularly cost-effectively.

Furthermore, provision can be made that the steering gear apparatus has a housing which is formed from a sliding rod housing for the sliding rod, from a gear housing for the gear section and from a motor housing for the motor.

According to an exemplary arrangement, the sliding rod housing and the gear housing are formed integrally here, as a result of which the steering gear apparatus is constructed from particularly few components.

According to another exemplary arrangement, the sliding rod housing and the gear housing are designed as two separate housing parts which are connected to each other, and therefore they can each be produced with little outlay.

In this connection, the sliding rod housing and the gear housing can each be formed integrally in order to keep the number of components low.

In an exemplary arrangement, the rack is arranged in the axial direction between the steering angle sensor and the worm wheel, as a result of which the steering gear apparatus is designed to particularly save on space.

In another exemplary arrangement, the worm wheel is arranged in the axial direction between the steering angle sensor and the rack. This configuration has the advantage that the steering gear apparatus has a compact construction.

BRIEF DESCRIPTION OF DRAWINGS

Further advantages and features emerge from the description below and from the attached drawings, in which.

DETAILED DESCRIPTION

Figure 1:
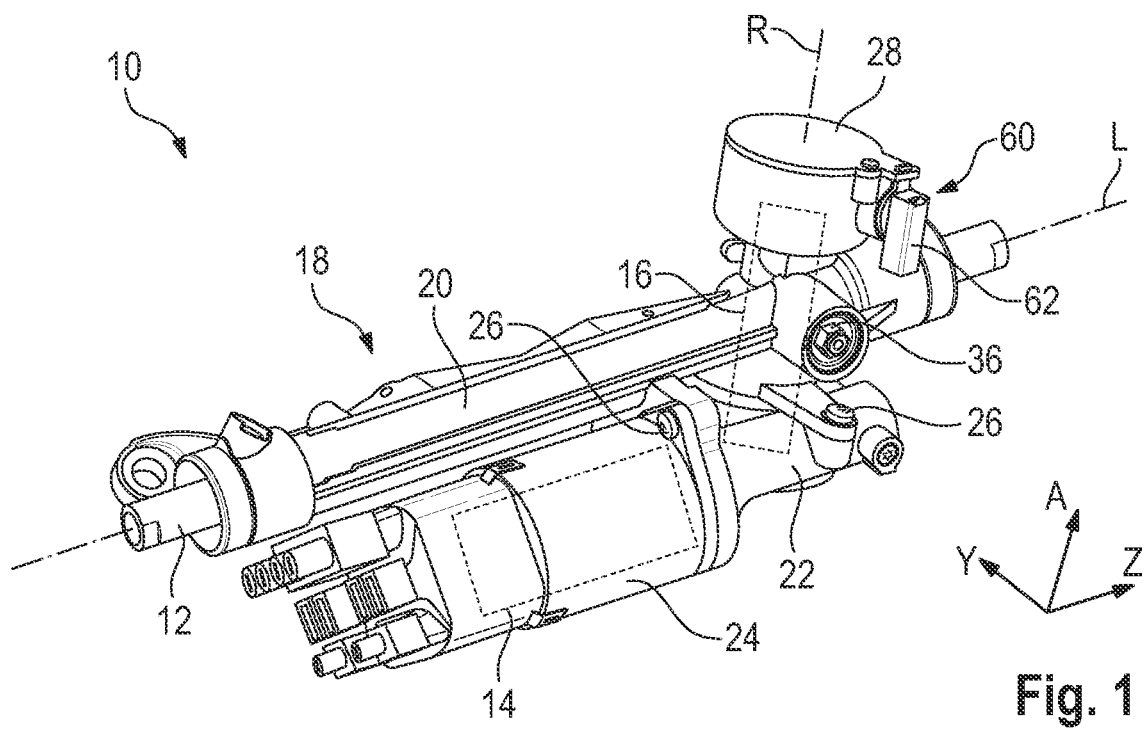
FIG. 1 shows, in a schematic illustration, a steering gear apparatus according to the disclosure.

FIG. 1 shows a steering gear apparatus 10 for a steer-by-wire steering system of a motor vehicle, which steering gear apparatus has a sliding rod 12, a motor 14 and a gear section 16 in which the motor 14 is coupled in terms of drive to the sliding rod 12.

The steering gear apparatus 10 furthermore has a housing 18 with a sliding rod housing 20, a gear housing 22 and a motor housing 24.

The sliding rod 12 is arranged in the sliding rod housing 20 and is mounted so as to be displaceable in a direction Z in which a longitudinal axis L of the sliding rod 12 extends.

The gear section 16 is accommodated or arranged in the gear housing 22, while the motor 14 is accommodated or arranged in the motor housing 24.

In an exemplary arrangement, the motor housing 24 is attached to the gear housing 22 by fasteners 26, for example in the form of screws.

Furthermore, the sliding rod housing 20 and the gear housing 22 are each formed integrally and fastened to each other via fasteners 26.

In principle, the sliding rod housing 20, the gear housing 22 and the motor housing 24 can be connected to one another in any desired way, in particular by material bonding, or with a form fit and; or force fit.

Figure 3:
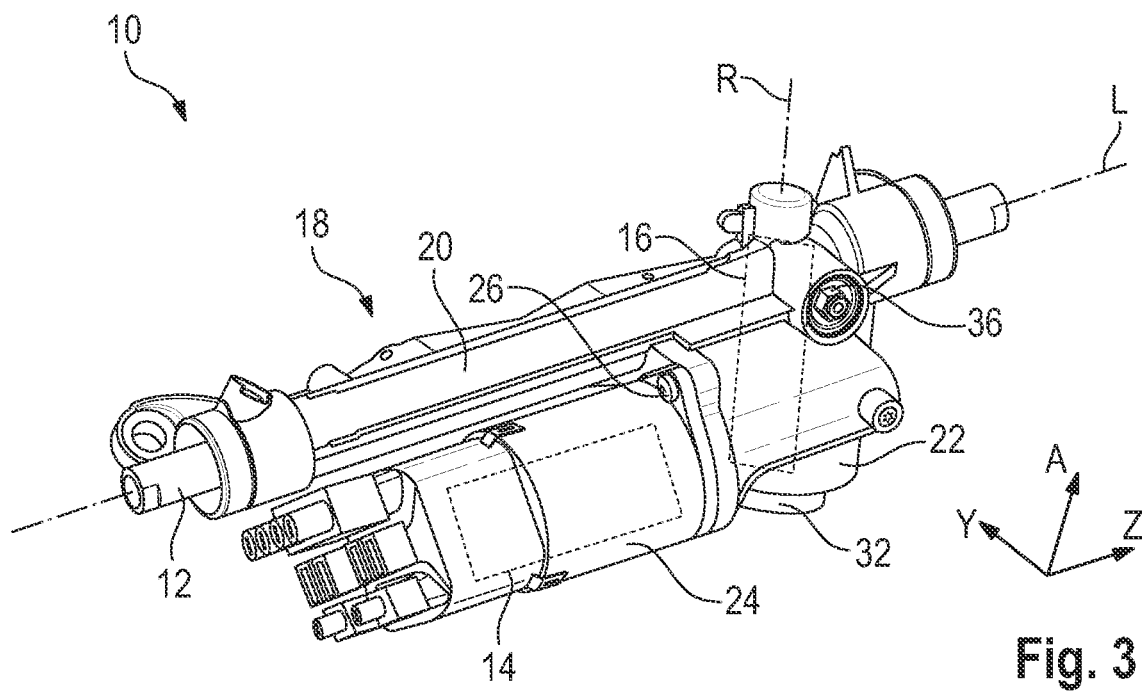
FIG. 3 shows, in a schematic illustration, a steering gear apparatus according to the disclosure according to another exemplary arrangement.
Figure 4:
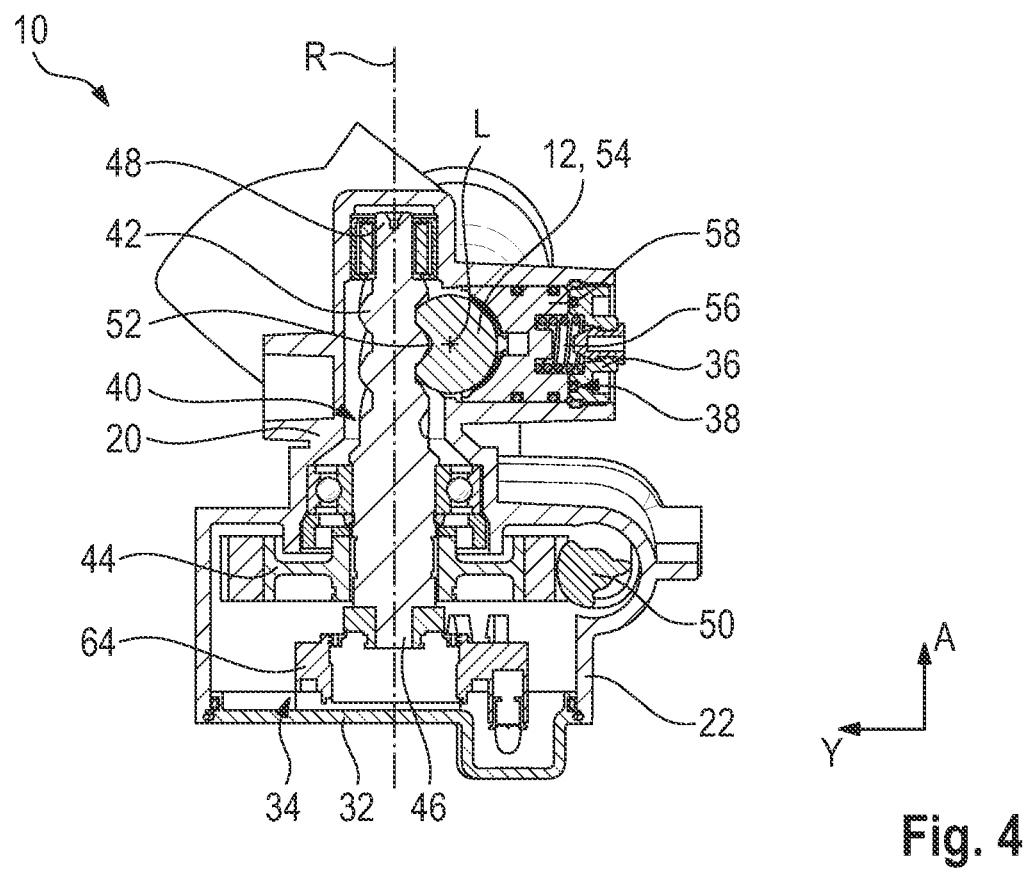
FIG. 4 shows, in a sectional view, the steering gear apparatus from FIG. 3, wherein the sectional plane runs through a sliding rod and a drive pinion of the steering gear apparatus.

In another exemplary arrangement, at least the sliding rod housing 20 and the gear housing 22, analogously to the arrangement illustrated in FIGS. 3 and 4, can be formed integrally with each other, i.e. as a single housing part.

Furthermore, the housing 18 has a cover 28, which covers a first opening 30 (see FIG. 2) in the sliding rod housing 20, and a first closure 32, which closes an opening 34 of the gear housing 22, and a second closure 36, which closes a second opening 38 in the sliding rod housing 20.

The openings 30, 34, 38 here each form an access to the gear section 16 and can be at least partially omitted in another exemplary arrangement.

In another exemplary arrangement, the housing 18 can have further covers 28 and/or closures 32, 36 which close openings, in particular openings which form an access to the gear section 16.

However, in all of the arrangements, the covers 28 and closures 32, 36 are not included here as part of the sliding rod housing 20 and of the gear housing 22 which can be formed integrally in each case or together.

In this connection, the housing 18 is designed to fasten the sliding rod 12, the motor 14 and the gear section 16 to an associated component of the motor vehicle such that, in the mounted state, they are attached fixed on the vehicle via the housing 18 to the associated component.

The gear section 16 is designed to replace the sliding rod 12 axially in the direction Z in the housing 18 via the motor 14 and, for this purpose, has a worm gear 40 (see FIG. 2) with a drive pinion 42 and a worm wheel 44.

The drive pinion 42 extends in the axial direction A from a first axial end 46 to an opposite second axial end 48 and has an axis of rotation R which extends in the axial direction A.

The worm wheel 44 is connected at the first axial end 46 to the drive pinion 42 for conjoint rotation and is in toothed engagement with a worm shaft 50.

In this connection, the worm shaft 50 is part of the gear section 16 and is coupled to the motor 14 so as to transmit torque.

In another exemplary arrangement, the worm shaft 50 is part of the motor 14 and forms, for example, a drive shaft of the motor 14.

Furthermore, the drive pinion 42 is in toothed engagement with a toothing 52 which is part of a rack 54 of the sliding rod 12.

In this connection, the drive pinion 42 is the only pinion which is in toothed engagement with the sliding rod 12.

Furthermore, the toothing 52 is the only toothing of the sliding rod 12.

In other words, apart from the drive pinion 42, there is no further pinion which drives the sliding rod 12 or is driven by the sliding rod 12 via a toothing.

In order to ensure that the drive pinion 42 is reliably in engagement with the toothing 52, the steering gear apparatus 10 has a thrust piece 58 which is pretensioned by a spring element 56 and presses the rack 54 in a direction Y against the drive pinion 42.

Furthermore, the steering gear apparatus 10 has a sensor device 60 with a sensor housing 62, a steering angle sensor 64, which is designed to detect the axial position of the sliding rod 12 and therefore the steering angle or the orientation of the motor vehicle wheels coupled to the sliding rod 12.

In an exemplary arrangement, the sensor housing 62 is attached to the sliding rod housing 20.

In another exemplary arrangement, the sensor housing 62 can be fastened to any desired component of the steering gear apparatus 10.

In another exemplary arrangement, it is possible for the sensor device 60 not to have a separate sensor housing 62, In this case, the sensor housing 62 is formed, for example, by the sliding rod housing 20.

In all of the arrangements, the steering angle sensor 64 is coupled to the drive pinion 42 in such a manner that the rotation of the drive pinion 42 about the axis of rotation R can be detected via the steering angle sensor 64.

For this purpose, the steering angle sensor 64 and/or the sensor device 60 can have further components, not illustrated in the figures, in order in a known manner to determine the axial position of the sliding rod 12 via the rotation of the drive pinion 42.

In an exemplary arrangement, the steering angle sensor 64 is attached at the second axial end 48 to the drive pinion 42 for conjoint rotation.

In this way, the rack 54 is arranged in the axial direction A between the worm wheel 44 and the steering angle sensor 64.

A steering gear apparatus 10 according to a further exemplary arrangement will now be described with reference to FIGS. 3 and 4. For the components which are known from the above exemplary arrangement, the same reference signs are used and reference is made to this extent to the previous explanations.

Figure 2:
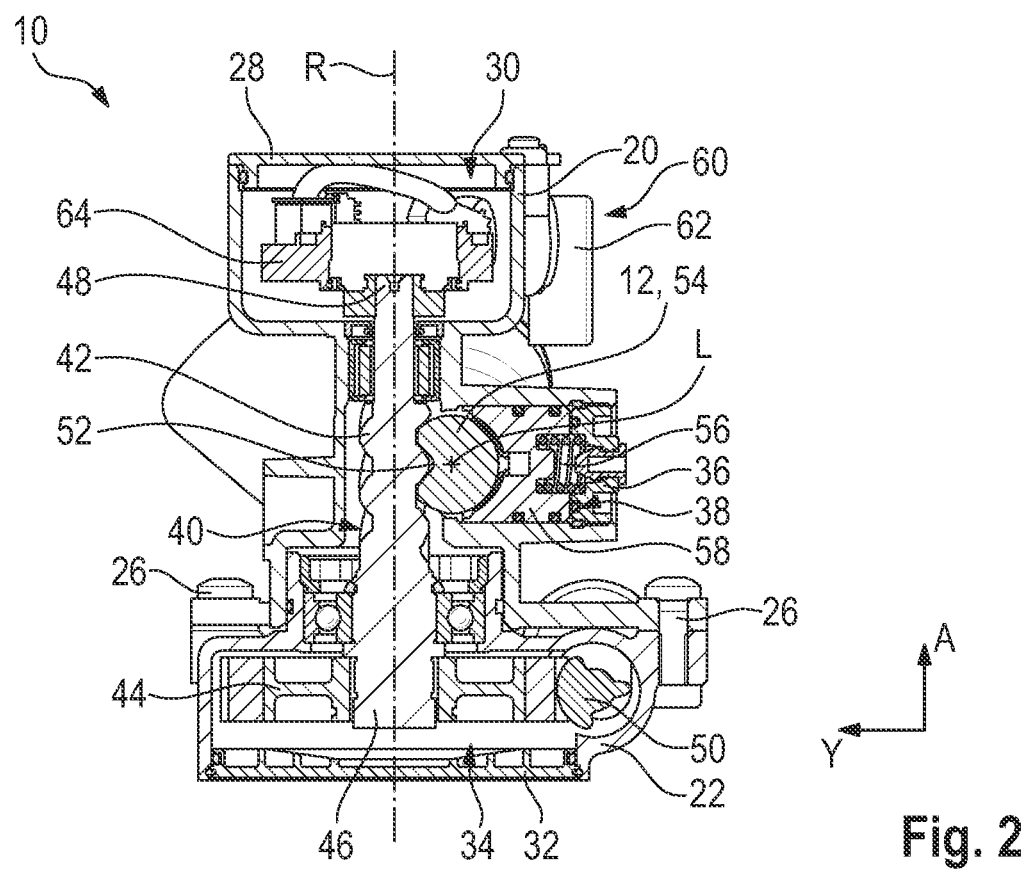
FIG. 2 shows, in a sectional view, the steering gear apparatus from FIG. 1, wherein the sectional plane runs through a sliding rod and a drive pinion of the steering gear apparatus.

In contrast to the exemplary arrangements illustrated in FIGS. 1 and 2, the steering angle sensor 64 in the exemplary arrangement illustrated in FIGS. 3 and 4 is attached together with the worm wheel 44 at the first axial end 46 to the drive pinion 42.

The worm wheel 44 is arranged here in the axial direction A between the rack 54 and the steering angle sensor 64.

Furthermore, in this exemplary arrangement, the first opening 30 which, in the exemplary arrangement illustrated in FIGS. 1 and 2, provides access to the second axial end 48 of the drive pinion 42 is omitted, and therefore so too is the cover 28 which closes this first opening 30.

Furthermore, the sliding rod housing 20 and the gear housing 22 are formed integrally with each other, i.e. they are formed by a single housing part.

In another exemplary arrangement, the sliding rod housing 20 and the gear housing 22, analogously to the exemplary arrangement illustrated in FIGS. 1 and 2, can each be designed as a separate housing part, which housing parts are connected to each other, for example by fasteners 26.

This provides a steering gear apparatus 10 which has a particularly compact construction and a low number of components.

The disclosure is not restricted to the exemplary arrangements which are shown. In particular, individual features of one exemplary arrangement can be combined as desired with features of other exemplary arrangements, in particular independently of the other features of the corresponding exemplary arrangements.

The invention claimed is:

1. A steering gear apparatus for a steer-by-wire steering system of a motor vehicle, comprising:
   a sliding rod, which has a rack with a toothing, the sliding rod being free of a mechanical connection to a steering wheel of the motor vehicle,
   a gear section, which has a worm gear with a worm wheel and a drive pinion extending in an axial direction (A),
   a motor
   a steering angle sensor,
   wherein the motor is connected via the worm gear to the drive pinion so as to transmit torque, and the drive pinion is in toothed engagement with the toothing, wherein the steering angle sensor is coupled to the drive pinion so as to transmit torque, the rack being arranged in the axial direction (A) between the steering angle sensor and the worm wheel, and
   a housing formed from a sliding rod housing for the sliding rod, a gear housing for the gear section and a motor housing for the motor, the sliding rod housing and the gear housing being integrally formed, the sliding rod housing having a first opening and the gear housing having a second opening.

2. The steering gear apparatus according to claim 1, wherein the steering angle sensor is attached directly to the drive pinion to directly sense the angle of rotation of the drive pinion.

3. The steering gear apparatus according to claim 1, wherein the drive pinion is the only drive pinion in toothed engagement with the sliding rod.

4. The steering gear apparatus according to claim 1, wherein the toothing is the only toothing of the sliding rod.

5. A steering gear apparatus for a steer-by-wire steering system of a motor vehicle, the steering gear apparatus comprising:
   a sliding rod including a rack having toothing, the sliding rod being free of a mechanical connection to a steering wheel of the vehicle;
   a gear section including a worm gear having a worm wheel and a drive pinion extending in an axial direction (A);
   a motor connected via the worm gear to the drive pinion so as to transmit torque, wherein the drive pinion is in toothed engagement with the toothing;
   a steering angle sensor configured to detect rotation of the drive pinion attached to the drive pinion to detect the angle of rotation of the drive pinion, the rack being arranged in the axial direction (A) between the steering angle sensor and the worm wheel, and
   a housing formed from a sliding rod housing for the sliding rod, a gear housing for the gear section and a motor housing for the motor, the sliding rod housing and the gear housing being integrally formed, the sliding rod housing having a first opening and the gear housing having a second opening.

6. The steering gear apparatus according to claim 5, wherein the drive pinion is the only drive pinion in toothed engagement with the sliding rod.

7. The steering gear apparatus according to claim 5, wherein the toothing is the only toothing of the sliding rod.

8. The steering gear apparatus according to claim 1, wherein the first opening is spaced from the second opening in the axial direction.

9. The steering gear apparatus according to claim 1, wherein the first opening is covered by a cover and the second opening is closed by a closure.

10. The steering gear apparatus according to claim 1, wherein the first opening is located adjacent a first axial end of the drive pinion coupled to the sensor and the second opening is located adjacent a second axial end of the pinion opposite the first axial end of the drive pinion.

11. The steering gear apparatus according to claim 1, wherein the first opening permits access to the sensor and the second opening permits access to the worm wheel.

12. The steering gear apparatus according to claim 1, wherein the housing includes a sensor housing for the sensor, the sensor housing being integrally formed with the sliding rod housing and the gear housing.

13. The steering gear apparatus according to claim 5, wherein the first opening is spaced from the second opening in the axial direction.

14. The steering gear apparatus according to claim 5, wherein the first opening is covered by a cover and the second opening is closed by a closure.

15. The steering gear apparatus according to claim 5, wherein the first opening is located adjacent a first axial end of the drive pinion coupled to the sensor and the second opening is located adjacent a second axial end of the pinion opposite the first axial end of the drive pinion.

16. The steering gear apparatus according to claim 5, wherein the first opening permits access to the sensor and the second opening permits access to the worm wheel.

17. The steering gear apparatus according to claim 5, wherein the housing includes a sensor housing for the sensor, the sensor housing being integrally formed with the sliding rod housing and the gear housing.

* * * * *